(12) United States Patent
Matsubara (10) Patent No.: US 11,554,611 B2
(45) Date of Patent: Jan. 17, 2023

(54) PNEUMATIC TIRE (71) Applicant: TOYO TIRE CORPORATION, Itami (JP)

(72) Inventor: Keisuke Matsubara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 363 days.

(21) Appl. No.: 16/710,098

(22) Filed: Dec. 11, 2019

(65) Prior Publication Data

US 2020/0207152 A1 Jul. 2, 2020

(30) Foreign Application Priority Data

Dec. 27, 2018 (JP) .............................. JP2018-245804

(51) Int. Cl.
*B60C 11/03* (2006.01)

(52) U.S. Cl.
CPC ...... *B60C 11/0304* (2013.01); *B60C 11/0302* (2013.01)

(58) Field of Classification Search
CPC . B60C 11/1353; B60C 11/1307; B60C 11/13; B60C 11/032; B60C 11/0304; B60C 11/0302

See application file for complete search history.

(56) References Cited

U.S. PATENT DOCUMENTS

| 2010/0175799 | A1* | 7/2010 | Takahashi | ............... B60C 11/13 152/209.3 |
|---|---|---|---|---|
| 2011/0277894 | A1 | 11/2011 | Takahashi | |
| 2013/0086821 | A1* | 4/2013 | Lussier | .................. A43B 13/04 36/25 R |
| 2016/0023519 | A1 | 1/2016 | Ogane | |
| 2016/0023520 | A1 | 1/2016 | Funaki | |
| 2016/0200148 | A1 | 7/2016 | Nomura | |

(Continued)

FOREIGN PATENT DOCUMENTS

| CN | 105050833 A | 11/2015 |
|---|---|---|
| CN | 105473347 A | 4/2016 |
| CN | 107053958 A | 8/2017 |

(Continued)

OTHER PUBLICATIONS

Office Action dated Sep. 2, 2021, issued in counterpart CN Application No. 201911278513.8, with English translation. (16 pages).

(Continued)

*Primary Examiner* — Cedrick S Williams (74) *Attorney, Agent, or Firm* — WHDA, LLP (57) ABSTRACT

A pneumatic tire includes a land portion provided in a tread portion and including a recess recessed inward in a tire radial direction. The recess includes three or more sides defining an opening that opens to a ground contact surface of the land portion and forming a polygon, and three or more side surface portions defined by the sides and line segments connecting respective vertexes of the sides and a bottom point provided on an inner side of the ground contact surface in the tire radial direction. The side surface portions are formed so as to approach the bottom point as the side surface portions extend inward in the tire radial direction from the ground contact surface.

6 Claims, 3 Drawing Sheets

(56) References Cited

U.S. PATENT DOCUMENTS

2017/0120683 A1    5/2017  Sato

FOREIGN PATENT DOCUMENTS

| JP | 2008201373 A | | 9/2008 |
| JP | 2014-177139 A | | 9/2014 |
| JP | 2019116196 A | * | 7/2019 |

OTHER PUBLICATIONS

Office Action dated Mar. 25, 2022, issued in counterpart CN application No. 201911278513.8, with the English machine translation. (20 pages).
Office Action dated Oct. 11, 2022, issued in counterpart JP application No. 2018-245804 with English translation. (5 ages).

* cited by examiner

PNEUMATIC TIRE

CROSS-REFERENCE TO RELATED APPLICATIONS

This application claims priority of Japanese Patent Application No.: 2018-245804 filed on Dec. 27, 2018, the content of which is incorporated herein by reference.

BACKGROUND OF THE INVENTION

Technical Field

The present invention relates to a pneumatic tire.

Related Art

In some known pneumatic tires, a recess recessed inward in the tire radial direction is formed in a land portion, such as a block and a rib, provided in a tread portion to improve the heat dissipation of the land portion and suppress a rise in the temperature of the land portion during the rolling of the tires.

For example, Japanese Patent Application Laid-Open No. 2014-177139 discloses a pneumatic tire provided with a narrow groove including groove wall surfaces and a groove bottom surface and extending in a tire width direction in a land portion of a tread portion. One of the groove wall surfaces facing each other in the tire circumferential direction of the narrow groove is provided with an air inflow part formed of an inclined surface, so that the heat dissipation of the land portion can be improved.

SUMMARY

Since the one described in Japanese Patent Application Laid-Open No. 2014-177139 is provided with a narrow groove including groove wall surfaces and a groove bottom surface in the land portion in the tread portion and also provided with an inclined surface on one of the groove wall surfaces facing each other in the tire circumferential direction of the narrow groove, the rigidity of the land portion provided in the tread portion may be lowered.

To address this, an object of the present invention is to provide a pneumatic tire that can improve the heat dissipation of a land portion provided in a tread portion and suppress a decrease in the rigidity of the land portion.

The present invention provides a pneumatic tire including: a land portion provided in a tread portion and including a recess recessed inward in a tire radial direction. The recess includes three or more sides defining an opening that opens to a ground contact surface of the land portion and forming a polygon, and three or more side surface portions defined by the sides and line segments connecting respective vertexes of the sides and a bottom point provided on an inner side of the ground contact surface in the tire radial direction. The side surface portions are formed so as to approach the bottom point as the side surface portions extend inward in the tire radial direction from the ground contact surface.

According to the present invention, the recess provided in the land portion in the tread portion is formed by the side surface portions that approach the bottom point as they extend inward in the tire radial direction from the ground contact surface. Thus, compared to the case where the recess is formed by a bottom surface portion and side surface portions extending at a right angle from the ground contact surface inward in the tire radial direction, the heat dissipation of the land portion provided in the tread portion can be improved and a decrease in the rigidity of the land portion can be suppressed.

Preferably, the recess is formed in a polygonal pyramid shape in which the side surface portions are inclined surfaces.

With this configuration, compared with the case where the recess is formed in a dome shape by a curved surface that approaches the bottom point as it extends inward in the tire radial direction from the ground contact surface, a decrease in the rigidity of the land portion can be suppressed.

Preferably, the recess is formed in a triangular pyramid shape.

With this configuration, compared with the case where the recess is formed in a polygonal pyramid shape other than a triangular pyramid shape, the heat dissipation of the land portion can be improved effectively and a decrease in the rigidity of the land portion can be suppressed effectively.

Preferably, the land portion is a block defined by a longitudinal groove extending in a tire circumferential direction and a lateral groove extending in a tire width direction, the block includes one or more recesses, and a ratio of a projected area of the one or more recesses on the ground contact surface to a projected area of the block on the ground contact surface is 5% or more and 20% or less.

With this configuration, when the land portion is a block, the recess is appropriately provided in the block, so that the heat dissipation of the block can be improved and a decrease in the rigidity of the block can be suppressed. If the ratio of the projected area of the entire recesses to the block is less than 5%, the heat dissipation effect of the block tends to be insufficient. If the ratio of the projected area of the entire recesses to the block is more than 20%, the rigidity of the block is likely to decrease.

Preferably, the land portion is a rib defined by two longitudinal grooves extending in a tire circumferential direction, the rib includes one or more recesses, and a ratio of a projected area of the one or more recesses on the ground contact surface to a projected area of the rib on the ground contact surface is 5% or more and 20% or less.

With this configuration, when the land portion is a rib, the recess provided in the rib is appropriately provided, the heat dissipation of the rib can be improved and a decrease in the rigidity of the rib can be suppressed. If the ratio of the projected area of the entire recesses to the rib is less than 5%, the heat dissipation effect of the rib tends to be insufficient. If the ratio of the projected area of the entire recesses to the rib is more than 20%, the rigidity of the rib is likely to decrease.

Preferably, the land portion includes a connection groove that connects the recess and a longitudinal groove extending in a tire circumferential direction.

With this configuration, the heat generated in the recess of the land portion can be released to the longitudinal groove through the connection groove, so that the heat dissipation of the land portion can be further improved. When the tire is running on a wet road surface, water in the recess of the land portion can flow out to the longitudinal groove through the connection groove, whereby drainage performance can be improved.

Preferably, the connection groove is provided to connect the bottom point of the recess and the longitudinal groove.

With this configuration, the connection groove forms a groove that leads to the longitudinal groove from the bottom point of the recess formed by the side surface portions approaching the bottom point as they extend inward in the tire radial direction from the ground contact surface. Thus, the heat dissipation and drainage performance of the land portion can be further improved.

Preferably, the connection groove includes a bottom surface portion and side surface portions on both sides, and one of the side surface portions in the connection groove forms an acute angle with the longitudinal groove and is provided with an inclined surface that inclines as the inclined surface extends inward in the tire radial direction from the ground contact surface.

With this configuration, the side surface portion in the connection groove which forms an acute angle with the longitudinal groove is provided with an inclined surface that inclines as it extends inward in the tire radial direction from the ground contact surface, so that the rigidity of the portion where the connection groove of the land portion and the longitudinal groove form an acute angle can be improved.

The pneumatic tire according to the present invention can improve the heat dissipation of a land portion provided in a tread portion and suppress a decrease in the rigidity of the land portion.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments of the present invention will be described with reference to the attached drawings.

Figure 1:
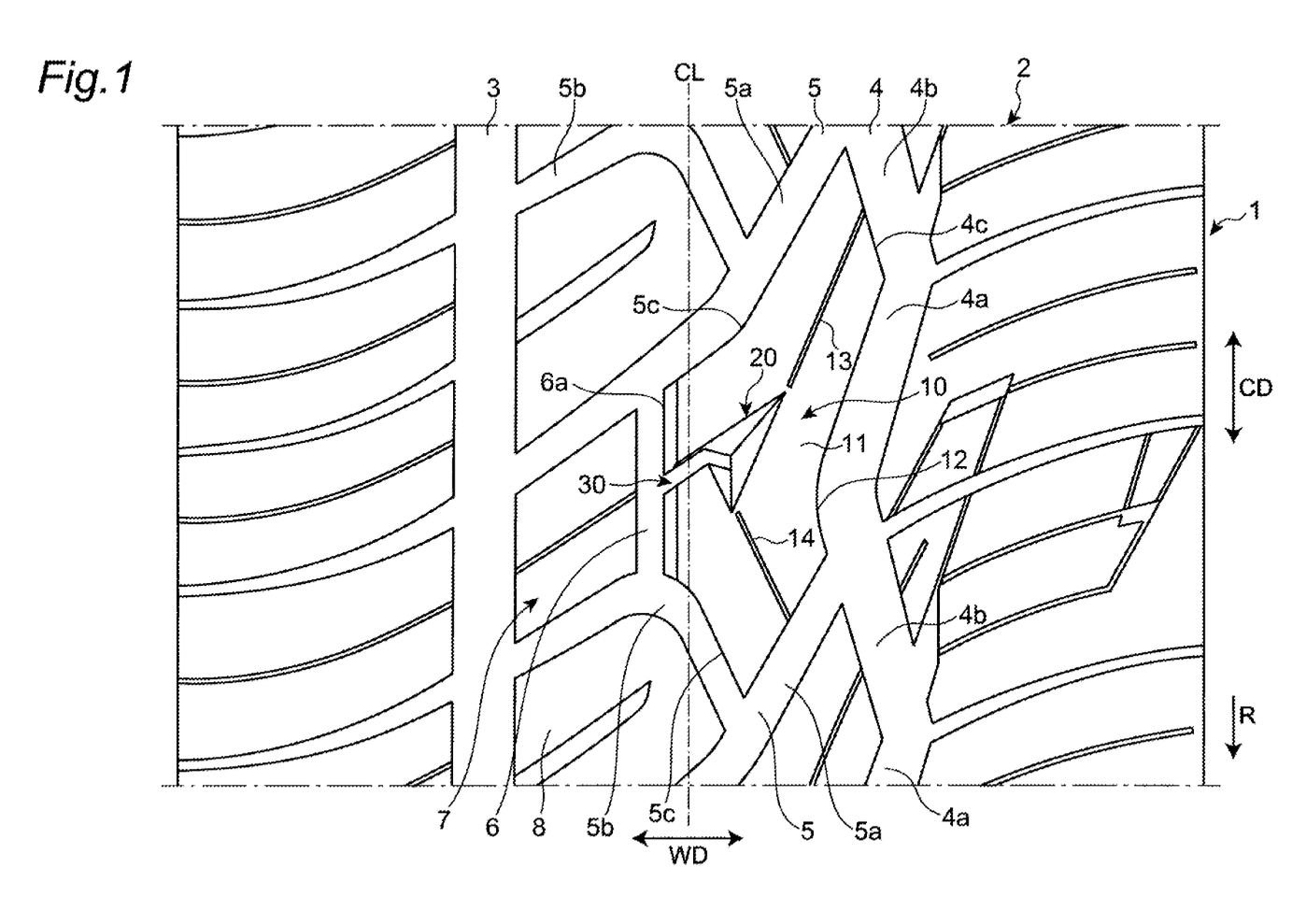
FIG. 1 is a development view illustrating a part of a tread portion of a pneumatic tire according to an embodiment of the present invention.

FIG. 1 is a development view illustrating a part of a tread portion of a pneumatic tire according to an embodiment of the present invention. Although not illustrated, the pneumatic tire 1 made of rubber according to an embodiment of the present invention is configured such that a carcass is spanned between a pair of bead cores, a belt is wound around the outer circumferential side of the middle part of the carcass for reinforcement, and the tire has a tread portion on the outer side of the belt in the tire radial direction.

As illustrated in FIG. 1, the pneumatic tire 1 has a tread portion 2. On the outer surface of the tread portion 2, a first longitudinal groove 3 and a second longitudinal groove 4 are formed, extending in a tire circumferential direction CD on the center side in a tire width direction WD and recessed inward in a tire radial direction. The first longitudinal groove 3 and the second longitudinal groove 4 are disposed on both sides of a tire center line CL extending in the tire circumferential direction on the tread portion 2.

The first longitudinal groove 3 extends linearly over the entire tire circumferential direction CD. The second longitudinal groove 4 extends in a zigzag shape over the entire tire circumferential direction CD. The second longitudinal groove 4 includes an inner longitudinal groove 4a gradually approaching the center side of the tire width direction WD toward a tire rotation direction R, and an outer longitudinal groove 4b gradually separated from the center side of the tire width direction WD toward the tire rotation direction R.

The outer surface of the tread portion 2 is also provided with a plurality of lateral grooves 5 extending in the tire width direction WD on the center side in the tire width direction WD and recessed inward in the tire radial direction. The plurality of lateral grooves 5 are formed in the same shape and are spaced apart from each other in the tire circumferential direction CD. The lateral grooves 5 communicate with the first longitudinal groove 3 and the second longitudinal groove 4.

The lateral grooves 5 include a primary lateral groove 5a that inclines in the tire rotation direction R as it extends from the second longitudinal groove 4 to the first longitudinal groove 3, and a secondary lateral groove 5b extending opposite to the tire rotation direction R from the center side in the tire width direction WD of the primary lateral groove 5a and extending in the tire width direction WD to communicate with the first longitudinal groove 3. The secondary lateral groove 5b has one end connected to the primary lateral groove 5a and the other end connected to the first longitudinal groove 3, and is formed to protrude in a direction opposite to the tire rotation direction R.

The outer surface of the tread portion 2 is also provided with a third longitudinal groove 6 extending in the tire circumferential direction CD between the first longitudinal groove 3 and the second longitudinal groove 4 in the tire width direction WD and recessed inward in the tire radial direction. The third longitudinal groove 6 communicates with the two lateral grooves 5 that are adjacent in the tire circumferential direction CD and extends linearly in the tire circumferential direction CD. The third longitudinal groove 6 communicates with the secondary lateral groove 5b of the lateral groove 5 disposed on the front side in the tire rotation direction R and the primary lateral groove 5a of the lateral groove 5 disposed on the rear side in the tire rotation direction R, and communicates with the first longitudinal groove 3 and the second longitudinal groove 4 via the lateral grooves 5.

The tread portion 2 is provided with land portions 10, 7, and 8 defined by the longitudinal grooves 3, 4, 6 extending in the tire circumferential direction CD and lateral grooves 5 extending in the tire width direction WD. The land portion 10 is a block defined by the longitudinal grooves 4 and 6 that are adjacent in the tire width direction WD and the lateral grooves 5 that are adjacent in the tire circumferential direction CD. The land portion 7 is a block defined by the longitudinal grooves 3 and 6 that are adjacent in the tire width direction WD and the lateral grooves 5 and 5 that are adjacent in the tire circumferential direction CD. The land portion 8 is a block defined by the longitudinal groove 3 and the lateral grooves 5, more specifically, by the longitudinal groove 3, the primary lateral groove 5a, and the secondary lateral groove 5b.

In the pneumatic tire 1, the land portion 10 corresponds to a land portion provided in the tread portion of the pneumatic tire according to the present invention. Hereinafter, the land portion 10 will be described.

The land portion 10 is a block defined by the second longitudinal groove 4 and the third longitudinal groove 6 that are adjacent in the tire width direction WD and the two lateral grooves 5 that are adjacent in the tire circumferential direction CD. The land portion 10 includes a ground contact surface 11 and side surface portions 12. The side surface portions 12 of the land portion 10 include a side surface portion 4c of the second longitudinal groove 4, a side surface portion 6a of the third longitudinal groove 6, a side surface portion 5c of the lateral groove 5 on the front side in the tire rotation direction R, and a side surface portion 5c of the lateral groove 5 on the rear side in the tire rotation direction R.

In the pneumatic tire 1, the land portion 10 has a recess 20 that is recessed inward in the tire radial direction from the ground contact surface 11. The recess 20 is provided on the center side of the land portion 10 that is separated from the side surface portions 12 of the land portion 10.

Figure 2:
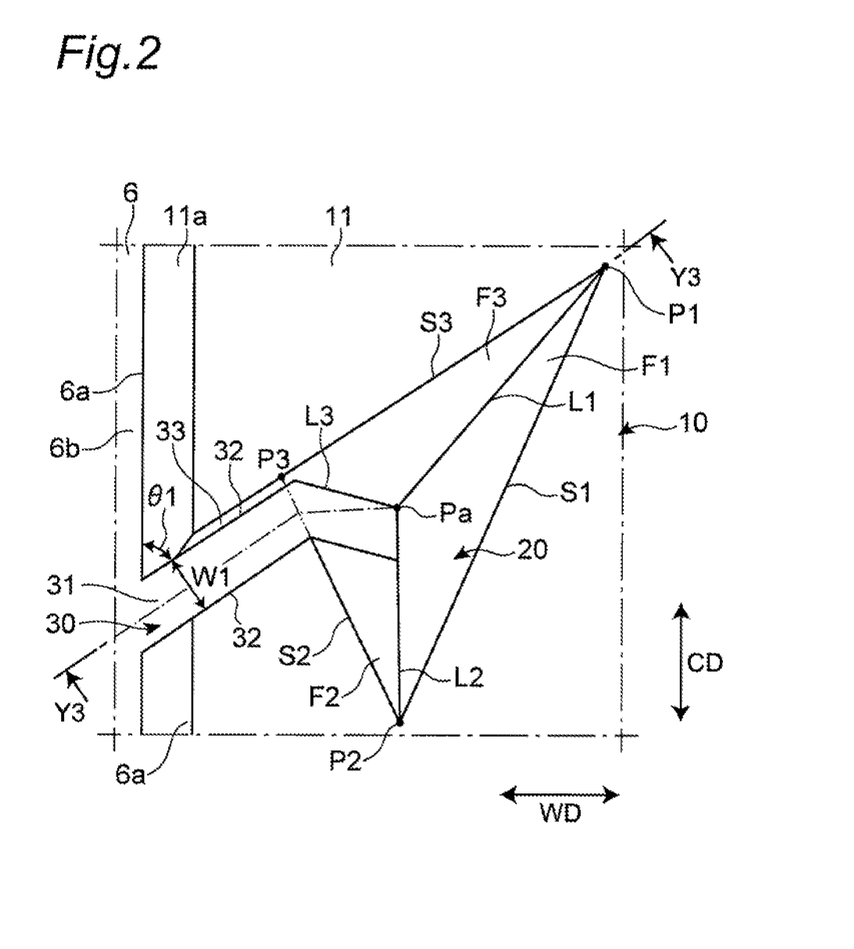
FIG. 2 is an enlarged view of a main part of the tread portion of the pneumatic tire illustrated in FIG. 1.
Figure 3:
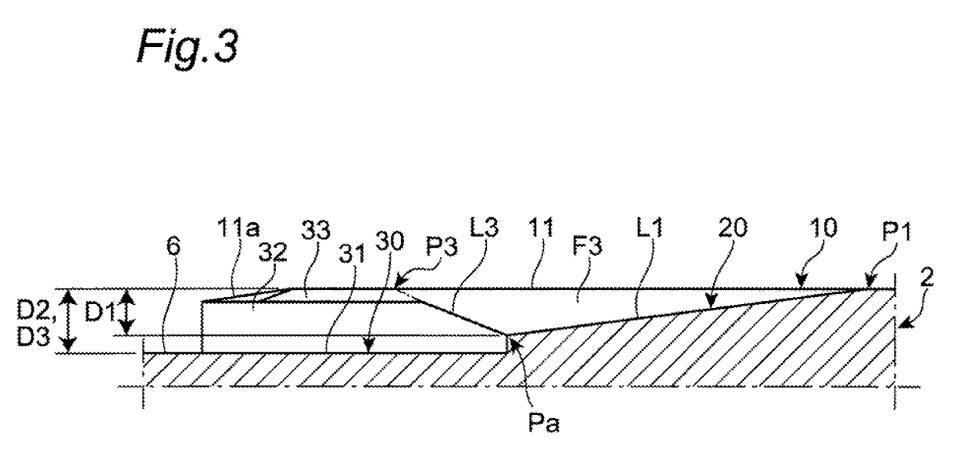
FIG. 3 is a cross-sectional view of the tread portion of the pneumatic tire taken along line Y3-Y3 in FIG. 2.

FIG. 2 is an enlarged view of a main part of the tread portion of the pneumatic tire illustrated in FIG. 1. FIG. 3 is a cross-sectional view of the tread portion of the pneumatic tire taken along line Y3-Y3 in FIG. 2. As illustrated in FIG. 2 and FIG. 3, the recess 20 formed in the land portion 10 has three sides (or edges) S1, S2, and S3 that define an opening that opens to the ground contact surface 11 of the land portion 10 and form a triangle, and also has three side surface portions F1, F2, and F3 that are defined by the sides S1, S2, and S3 and line segments L1, L2, and L3 connecting respective vertexes P1, P2, and P3 of the sides S1, S2, and S3 and a bottom point Pa provided on the inner side of the ground contact surface 11 in the tire radial direction.

The side surface portions F1, F2, and F3 of the recess 20 are each formed by an inclined surface that approaches the bottom point Pa as it extends inward in the tire radial direction from the ground contact surface 11. The recess 20 is formed in a triangular pyramid shape by the side surface portions F1, F2, and F3. The bottom point Pa of the recess 20 is provided so as to be located within a polygon opened in the ground contact surface 11 of the recess 20 when projected to the outer side in the tire radial direction on the ground contact surface 11.

The recess 20 is provided such that the vertex P2 of the triangle opened in the ground contact surface 11 is located on the front side in the tire rotation direction, and the vertex P3 of the triangle opened in the ground contact surface 11 is located on the side of the third longitudinal groove and on the rear side in the tire rotational direction from the vertex P2, and the vertex P1 of the triangle opened in the ground contact surface 11 is located opposite to the third longitudinal groove from the vertex P2 and on the rear side in the tire rotation direction R from the vertex P3.

The lengths of the sides S1, S2, and S3 of the recess 20 are set to 40 mm, 20 mm, and 30 mm, respectively. The lengths of the sides S1, S2, and S3 of the recess 20 are set to 10 mm to 50 mm, for example. The depth D1 of the recess 20, specifically, the depth D1 of the bottom point Pa from the ground contact surface 11 is set to 5 mm. The depth D1 of the recess 20 is set to 3 mm to 8 mm, for example. For example, the depth D1 of the recess 20 may be set to 30% to 80% of the depth D3 of the longitudinal grooves 3, 4, and 6.

In the present embodiment, the land portion 10 is a block defined by the longitudinal grooves 3 and 4 and the lateral grooves 5, and one recess 20 is provided in the block 10. The ratio of the projected area of the recess 20 on the ground contact surface 11 to the projected area of the block 10 on the ground contact surface 11 is set to 5% or more and 20% or less. This is because the heat dissipation effect of the block is likely to be insufficient if the ratio is less than 5%, and the rigidity of the block is likely to decrease if the ratio is more than 20%.

The ratio of the projected area of the recess 20 on the ground contact surface 11 to the projected area of the block 10 on the ground contact surface 11 refers to the ratio of the opening area of the recess 20 to the surface area of the entire outer surface of the block 10 when the block 10 is viewed in a planar view as illustrated in FIG. 1.

The land portion 10 includes a connection groove 30 that connects the recess 20 and the third longitudinal groove 6 extending in the tire circumferential direction CD. The connection groove 30 is formed to be recessed inward in the tire radial direction from the ground contact surface 11, and includes a bottom surface portion 31 and side surface portions 32 on both sides extending perpendicularly from both sides of the bottom surface portion 31 in the tire circumferential direction CD and outward in the tire radial direction.

The connection groove 30 communicates with the recess 20 and the third longitudinal groove 6 and extends in the tire width direction WD. The connection groove 30 extends in the tire width direction WD from the third longitudinal groove 6 to the side S2 of the recess 20 in parallel with the side S3 of the recess 20 so as to have a predetermined angle θ1, for example 60 degrees, with the third longitudinal groove 6. The connection groove 30 also extends in the tire width direction WD along the line segment L3 of the recess 20 from the side S2 of the recess 20 to the line segment L2 including the bottom point Pa of the recess 20. In this way, the connection groove 30 is provided so as to connect the bottom point Pa and the third longitudinal groove 6.

The connection groove 30 is provided with an inclined surface 33 that inclines toward the center in the width direction of the connection groove 30 as it extends inward in the tire radial direction from the ground contact surface 11, on the side surface portion 32 that forms an acute angle with the third longitudinal groove 6. In the land portion 10, a predetermined angle θ1 is set to 60 degrees, and the inclined surface 33, which inclines toward the center in the width direction of the connection groove 30, is provided on the side surface portion 32 on the rear side in the tire rotation direction R that forms an acute angle with the third longitudinal groove 6. The land portion 10 is provided with an inclined surface 11a on the ground contact surface 11 on the third longitudinal groove 6 side.

The connection groove 30 is provided with the side surface portions 32 on both sides in parallel, and the width W1 of the connection groove 30 is set to 5 mm. The width W1 of the connection groove 30 is set to 2 mm to 7 mm, for example. The connection groove 30 is formed so that the bottom surface portion 31 has a depth D2 on the inner side in the tire radial direction from the ground contact surface 11, and is formed deeper than the recess 20. The depth D2 of the connection groove 30 is set to 8 mm. The depth D2 of the connection groove 30 is set to 5 mm to 10 mm, for example.

Although the depth D2 of the connection groove 30 is formed deeper than the depth D1 of the recess 20, it may also be formed equal to the depth D1 of the recess 20. The depth D2 of the connection groove 30 is formed to be equal to the depth D3 of the third longitudinal groove 6, but it may be formed shallower than the depth D3 of the third longitudinal groove 6.

The land portion 10 is also provided with slits 13 and 14 extending from the ground contact surface 11 inward in the tire radial direction. The slit 13 extends from the vicinity of the vertex P1 of the recess 20 toward the second longitudinal groove 4, and the slit 14 extends from the vicinity of the vertex P2 of the recess 20 toward the lateral groove 5.

In the present embodiment, the recess 20 provided in the land portion 10 is formed in a triangular pyramid shape including the three sides S1, S2, and S3 defining an opening that opens to the ground contact surface 11 and forming a triangle and the three side surface portions F1, F2, and F3. Instead, the recess 20 may be formed in another triangular pyramid shape including three sides defining an opening that opens to the ground contact surface 11 of the land portion 10 and forming a triangle and three side surface portions defined by the sides and line segments connecting respective vertexes of the sides and a bottom point provided on the inner side of the ground contact surface 11 in the tire radial direction, the side surface portions approaching the bottom point as they extend inward in the tire radial direction from the ground contact surface 11.

Instead, the recess provided in the land portion 10 may be formed in another polygonal pyramid shape, such as a quadrangular pyramid, including three or more sides defining an opening that opens to the ground contact surface 11 of the land portion 10 and forming a polygon and three or more side surface portions defined by the sides and line segments connecting respective vertexes of the sides and a bottom point provided on the inner side of the ground contact surface 11 in the tire radial direction, the side surface portions approaching the bottom point as they extend inward in the tire radial direction from the ground contact surface 11.

The recess provided in the land portion 10 to be recessed inward in the tire radial direction is preferably formed in a polygonal pyramid shape, but may be formed in a dome shape including three or more sides defining an opening that opens to the ground contact surface 11 of the land portion 10 and forming a polygon and three or more side surface portions defined by the sides and line segments connecting respective vertexes of the sides and a bottom point provided on the inner side of the ground contact surface 11 in the tire radial direction, the side surface portions approaching the bottom point as they extend inward in the tire radial direction from the ground contact surface 11.

In the present embodiment, the land portion 10 includes the connection groove 30 connecting the recess 20 and the third longitudinal groove 6, but the land portion 10 may include a connection groove for connecting the recess 20 and the second longitudinal groove 4 extending in the tire circumferential direction CD. The connection groove connecting the recess 20 and the second longitudinal groove 4 extending in the tire circumferential direction CD is also preferably provided so as to connect the bottom point Pa of the recess 20 and the second longitudinal groove 4.

The connection groove connecting the recess 20 and the second longitudinal groove 4 extending in the tire circumferential direction CD also includes a bottom surface portion and side surface portions on both sides, and is preferably provided with an inclined surface that inclines toward the center of the connection groove as it extends inward in the tire radial direction from the ground contact surface 11, on the side surface portion in the connection groove which forms an acute angle with the second longitudinal groove 4.

In the present embodiment, the land portion 10 includes the connection groove 30 connecting the recess 20 and the third longitudinal groove 6 extending in the tire circumferential direction CD, but may include no connection groove.

As described above, the pneumatic tire 1 according to the present embodiment includes the land portion 10 provided in the tread portion 2 and including the recess 20 recessed inward in the tire radial direction. The recess 20 is formed so as to include the three or more sides S1, S2, and S3 defining an opening that opens to the ground contact surface 11 of the land portion 10 and forming a polygon and the three or more side surface portions F1, F2, and F3 defined by the sides S1, S2, and S3 and line segments L1, L2, and L3 connecting respective vertexes P1, P2, and P3 of the sides S1, S2, and S3 and the bottom point Pa provided on the inner side of the ground contact surface 11 in the tire radial direction, the side surface portions F1, F2, and F3 approaching the bottom point Pa as they extend inward in the tire radial direction from the ground contact surface 11.

Thus, the recess 20 provided in the land portion 10 in the tread portion 2 is formed by the side surface portions F1, F2, and F3 that approach the bottom point Pa as they extend inward in the tire radial direction from the ground contact surface 11. Thus, compared to the case where the recess 20 is formed by a bottom surface portion and side surface portions extending at a right angle from the ground contact surface 11 inward in the tire radial direction, the heat dissipation of the land portion 10 provided in the tread portion 2 can be improved and a decrease in the rigidity of the land portion 10 can be suppressed. Furthermore, the edge effect can be obtained by the sides S1, S2, and S3 forming the polygon of the recess 20, and the steering stability can be improved.

Furthermore, the recess 20 is formed in a polygonal pyramid shape in which the side surface portions F1, F2, and F3 are inclined surfaces. Thus, compared with the case where the recess 20 is formed in a dome shape by a curved surface that approaches the bottom point Pa as it extends inward in the tire radial direction from the ground contact surface 11, a decrease in the rigidity of the land portion 10 can be suppressed.

The recess 20 is formed in a triangular pyramid shape. Thus, compared with the case where the recess 20 is formed in a polygonal pyramid shape other than a triangular pyramid shape, the heat dissipation of the land portion 10 can be improved effectively and a decrease in the rigidity of the land portion can be suppressed effectively.

In the present embodiment, one recess 20 is provided in the land portion 10 that is a block, but a plurality of recesses 20 may be provided in the block 10. In such a case, the ratio of the projected area of the plurality of recesses 20 on the ground contact surface 11 to the projected area of the block 10 on the ground contact surface 11 is set to 5% or more and 20% or less. Note that the ratio of the projected area of the plurality of recesses 20 on the ground contact surface 11 to the projected area of the block 10 on the ground contact surface 11 refers to the ratio of the opening area of the plurality of recesses 20 to the surface area of the entire outer surface of the block 10 when the block 10 is viewed in a planar view.

As described above, the land portion 10 is a block defined by the longitudinal grooves 4 and 6 extending in the tire circumferential direction CD and the lateral grooves 5 extending in the tire width direction WD, and the block 10 includes one or more recesses 20. The ratio of the projected area of the one or more recesses 20 on the ground contact surface 11 to the projected area of the block 10 on the ground contact surface 11 is 5% or more and 20% or less. Thus, when the land portion 10 is a block, the recess 20 is appropriately provided in the block 10, so that the heat dissipation of the block 10 can be improved and a decrease in the rigidity of the block 10 can be suppressed. If the ratio of the projected area of the entire recesses 20 to the block 10 is less than 5%, the heat dissipation effect of the block 10 tends to be insufficient. If the ratio of the projected area of the entire recesses 20 to the block 10 is more than 20%, the rigidity of the block 10 is likely to decrease.

Furthermore, the land portion 10 includes the connection groove 30 connecting the recess 20 and the longitudinal groove 6 extending in the tire circumferential direction CD. Thus, the heat generated in the recess 20 of the land portion 10 can be released to the longitudinal groove 6 through the connection groove 30, so that the heat dissipation of the land portion 10 can be further improved. When the tire is running on a wet road surface, water in the recess 20 of the land portion 10 can flow out to the longitudinal groove 6 through the connection groove 30, whereby drainage performance can be improved.

Furthermore, the connection groove 30 is provided so as to connect the bottom point Pa of the recess 20 and the longitudinal groove 6. Thus, the connection groove 30 forms a groove that leads to the longitudinal groove 6 from the bottom point Pa of the recess 20 formed by the side surface portions F1, F2, and F3 approaching the bottom point Pa as they extend inward in the tire radial direction from the ground contact surface 11. Thus, the heat dissipation and drainage performance of the land portion 10 can be further improved.

Furthermore, the connection groove 30 includes the bottom surface portion 31 and the side surface portions 32 on both sides, and is provided with the inclined surface that inclines as it extends inward in the tire radial direction from the ground contact surface 11, on the side surface portion 32 in the connection groove 30 which forms an acute angle with the longitudinal groove 6. Thus, the side surface portion 32 in the connection groove 30 which forms an acute angle with the longitudinal groove 6 is provided with an inclined surface that inclines as it extends inward in the tire radial direction from the ground contact surface 11, so that the rigidity of the portion where the connection groove 30 in the land portion 10 and the longitudinal groove 6 form an acute angle can be improved.

In the pneumatic tire 1 according to the present embodiment, the land portion 10 provided in the tread portion 2 is a block defined by the plurality of longitudinal grooves 3 and 4 extending in the tire circumferential direction CD and the plurality of lateral grooves 5 extending in the tire width direction WD. Instead, the land portion 10 provided in the tread portion 2 may be a rib defined by two longitudinal grooves that extend in the tire circumferential direction CD over the entire tire circumferential direction CD and are adjacent to each other in the tire width direction.

Even in such a case, the rib includes one or more recesses that are configured in the same manner as the recess 20 formed in the block 10 and that are recessed inward in the tire radial direction from the ground contact surface 11, and the ratio of the projected area of the one or more recesses on the ground contact surface to the projected area of the rib on the ground contact surface is set to 5% or more and 20% or less. This is because the heat dissipation effect of the block is likely to be insufficient if the ratio is less than 5%, and the rigidity of the block is likely to decrease if the ratio is more than 20%.

The ratio of the projected area of the one or more recesses on the ground contact surface to the projected area of the rib on the ground contact surface refers to the ratio of the opening area of the one or more recesses to the surface area of the entire outer surface of the rib provided over the entire tire circumferential direction when the rib is viewed in a planar view, as in the above-described case where the land portion is a block.

The rib is also provided with a connection groove formed in the same manner as the connection groove 30 formed in the block 10, between the recess and the longitudinal groove extending in the tire circumferential direction.

As described above, the land portion 10 is a rib defined by the two longitudinal grooves extending in the tire circumferential direction, the rib includes one or more recesses, and a ratio of the projected area of the one or more recesses on the ground contact surface to the projected area of the rib on the ground contact surface is 5% or more and 20% or less. Thus, when the land portion is a rib, the recess provided in the rib is appropriately provided, the heat dissipation of the rib can be improved and a decrease in the rigidity of the rib can be suppressed. If the ratio of the projected area of the entire recesses to the rib is less than 5%, the heat dissipation effect of the rib tends to be insufficient. If the ratio of the projected area of the entire recesses to the rib is more than 20%, the rigidity of the rib is likely to decrease.

The present invention is not limited to the illustrated embodiments, and various improvements and design changes are possible without departing from the scope of the present invention.

What is claimed is:

1. A pneumatic tire comprising a land portion provided in a tread portion, the land portion including a recess recessed inward in a tire radial direction and a connection groove that connects the recess to a longitudinal groove extending in a tire circumferential direction,
   wherein the recess includes:
      three or more sides defining an opening that opens to a ground contact surface of the land portion and forming a polygon; and
      three or more side surface portions defined by the sides and line segments connecting respective vertexes of the sides to a bottom point provided on an inner side of the ground contact surface in the tire radial direction, and formed so as to approach the bottom point as the side surface portions extend inward in the tire radial direction from the ground contact surface,
   wherein the connection groove extends in a tire width direction to one of the sides in parallel with another of the sides, and extends in the tire width direction along one of the line segments from the one of the sides to another of the line segments including the bottom point, and
   wherein the recess is formed in a polygonal pyramid shape in which the side surface portions are inclined surfaces.

2. The pneumatic tire according to claim 1, wherein the recess is formed in a triangular pyramid shape.

3. The pneumatic tire according to claim 1, wherein
   the land portion is a block defined by the longitudinal groove extending in the tire circumferential direction and a lateral groove extending in the tire width direction,
   the block includes one or more recesses each including the recess, and
   a ratio of a projected area of the one or more recesses on the ground contact surface to a projected area of the block on the ground contact surface is 5% or more and 20% or less.

4. The pneumatic tire according to claim 1, wherein
   the land portion is a rib defined by two longitudinal grooves including the longitudinal groove and extending in the tire circumferential direction,
   the rib includes one or more recesses each including the recess, and
   a ratio of a projected area of the one or more recesses on the ground contact surface to a projected area of the rib on the ground contact surface is 5% or more and 20% or less.

5. The pneumatic tire according to claim 1, wherein the connection groove connects the bottom point to the longitudinal groove.

6. A pneumatic tire comprising a land portion provided in a tread portion, the land portion including a recess recessed inward in a tire radial direction and a connection groove that connects the recess to a longitudinal groove extending in a tire circumferential direction,
   wherein the recess includes:
      three or more sides defining an opening that opens to a ground contact surface of the land portion and forming a polygon; and
      three or more side surface portions defined by the sides and line segments connecting respective vertexes of the sides to a bottom point provided on an inner side of the ground contact surface in the tire radial direction, and formed so as to approach the bottom point as the side surface portions extend inward in the tire radial direction from the ground contact surface,
   wherein the connection groove extends in a tire width direction to one of the sides in parallel with another of the sides, and extends in the tire width direction along one of the line segments from the one of the sides to another of the line segments including the bottom point, and wherein
   the connection groove includes a bottom surface portion and side surface portions on both sides, and
   one of the side surface portions in the connection groove forms an acute angle with the longitudinal groove and is provided with an inclined surface that inclines as the inclined surface extends inward in the tire radial direction from the ground contact surface.

* * * * *